UNITED STATES PATENT OFFICE.

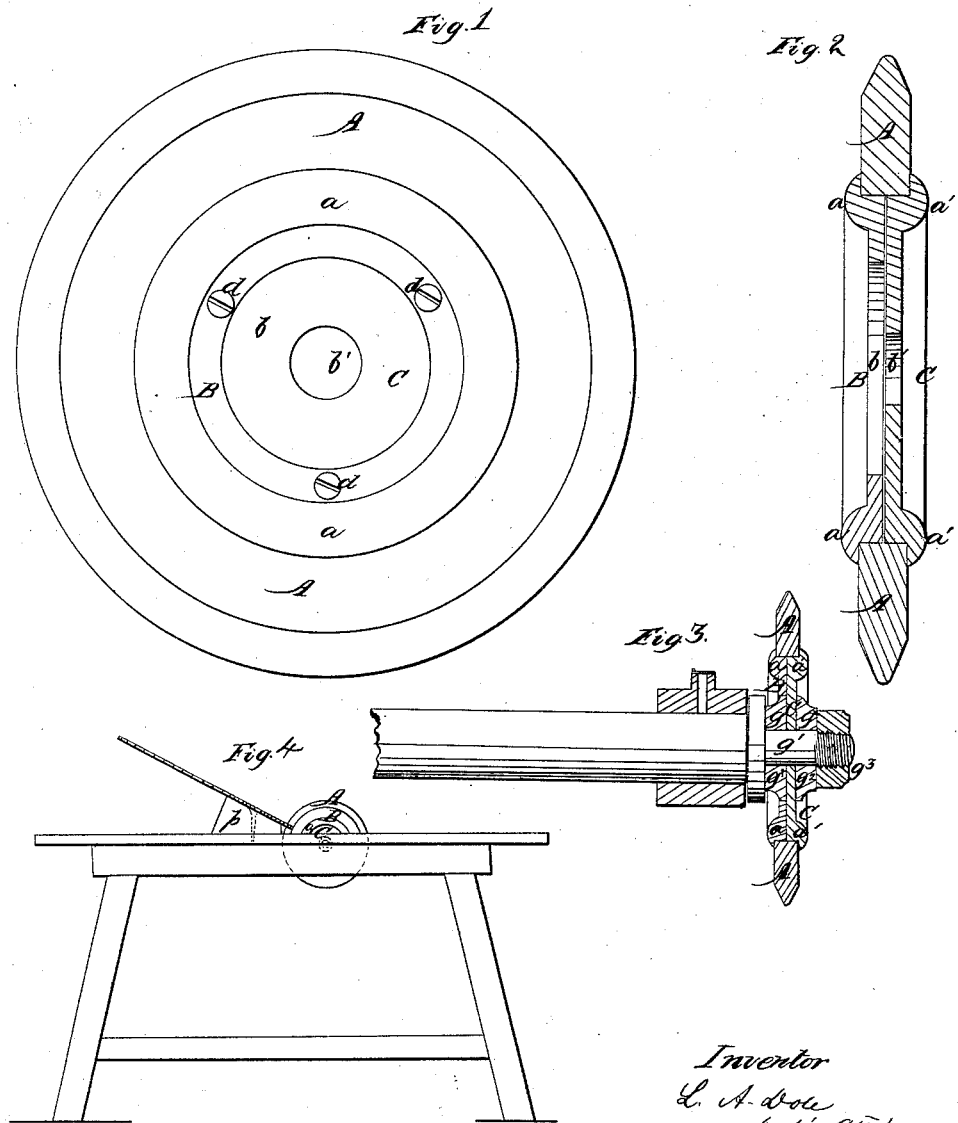

L. A. DOLE, OF SALEM, OHIO, ASSIGNOR TO HIMSELF, AND ALBERT B. SILVER, OF SAME PLACE.

IMPROVED SAW-GUMMER.

Specification forming part of Letters Patent No. 45,117, dated November 15, 1864.

*To all whom it may concern:*

Be it known that I, L. A. DOLE, of Salem, county of Columbiana, State of Ohio, have invented a new and Improved Saw-Gummer; and I do hereby declare that the following is a full, clear, and exact description thereof, reference being had to the accompanying drawings, making part of this specification, in which—

Figure 1 is a view of one side of my improved saw-gummer. Fig. 2 is a diametrical section through Fig. 1. Fig. 3 is a sectional view showing the application of the saw-gummer to a common circular-saw arbor. Fig. 4 is a side elevation of a common circular-saw table, showing the manner of "gumming" saws.

Similar letters of reference indicate corresponding parts in the several figures.

This invention is an improvement in saw-gummers for gumming out the curved throats of circular saws, so that the dust, &c., will escape freely therefrom during the operation of sawing.

The object of my invention is to adapt a circular-saw gummer to be received upon the arbor of a circular saw, and to be secured thereon by means of the collars which are employed to secure the saw in place, as will be hereinafter described.

To enable others skilled in the art to make and use my invention, I will describe its construction and operation.

The grindstone A, which I propose to employ, may be made of any suitable substance adapted to the purpose of gumming saws; but I prefer to use a composition containing emery in large quantities, which is molded in the form of a thin disk, with its edge beveled or rounded, as shown in Figs. 2 and 3. This grindstone has a large circular eye made through its center to receive two metallic plates, B C, which, when they are brought together, as shown in Fig. 2, form an annular groove at their circumference, adapted to receive within it the stone A. The circumferences of these plates have enlarged rims formed on them, as shown at $a\ a'$, to give strength and also to form flanges for receiving the stone, and those thin portions of these plates B C which are surrounded by said flanges are perforated, as shown at $b\ b'$. The perforation $b$ through the plate B is made of sufficient size to admit within it the collar $g$ on the saw-arbor $g'$, and to allow the thin plate C to be brought up snugly against said collar, as shown in Fig. 3, after which the outer collar, $g^2$, is forced up against the opposite side of the plate C by means of the binding nut $g^3$. The clamping-plates B C are so formed and secured together by means of screws $d\ d\ d$ that the plate which forms the central portion of the gummer can be made sufficiently thin to occupy the place of a circular saw on its arbor, and to be clamped thereon by means of the collars which are used for clamping the saw in place.

The construction of the plates B C enable me to adapt the gummer to be received upon a common saw-arbor without making any change whatever, and hence a separate frame-work adapted exclusively for supporting the gummer is rendered unnecessary.

By my invention a person who possesses a circular sawing machine, of any description, and also one of my improved gummers, can resharpen the saw at pleasure.

In Fig. 4 I have represented a common circular-saw table with a gummer applied on the saw-arbor in place of the saw, which latter is represented in a position for being gummed. The inclined block $p$ (shown in this figure) is intended as a rest for the saw during the operation of gumming it.

What I claim as new, and desire to secure by Letters Patent, is—

The employment of metallic clamps B C, constructed to receive and hold the grindstone, and also to constitute a thin central plate for receiving the saw-arbor and the collars thereon, substantially as described.

Witness my hand in the matter of my application for a patent on an improved saw-gummer this 5th day of September, 1864.

L. A. DOLE.

Witnesses:
C. C. BRAINARD,
R. H. GARRIGUES.